US010148117B2

(12) United States Patent
Lethellier et al.

(10) Patent No.: US 10,148,117 B2
(45) Date of Patent: Dec. 4, 2018

(54) LOW INDUCTANCE PAD WINDING USING A MATCHED WINDING OF MULTIPLE SPIRALS

(71) Applicant: Wireless Advanced Vehicle Electrification, Inc., Salt Lake City, UT (US)

(72) Inventors: Patrice Lethellier, Salt Lake City, UT (US); Hunter Wu, Sunnyvale, CA (US)

(73) Assignee: WIRELESS ADVANCED VEHICLE ELECTRIFICATION, INC., Salt Lake City, UT (US)

( * ) Notice: Subject to any disclaimer, the term of this patent is extended or adjusted under 35 U.S.C. 154(b) by 77 days.

(21) Appl. No.: 15/195,836

(22) Filed: Jun. 28, 2016

(65) Prior Publication Data

US 2016/0380469 A1  Dec. 29, 2016

Related U.S. Application Data

(60) Provisional application No. 62/186,257, filed on Jun. 29, 2015.

(51) Int. Cl.
*H02J 7/00* (2006.01)
*H01F 38/14* (2006.01)
(Continued)

(52) U.S. Cl.
CPC ............. *H02J 7/025* (2013.01); *H01F 38/14* (2013.01); *H02J 50/10* (2016.02); *H02J 50/70* (2016.02)

(58) Field of Classification Search
CPC .. H02J 50/10; H02J 50/12; H02J 50/60; H02J 50/70; H02J 50/80; H02J 50/90;
(Continued)

(56) References Cited

U.S. PATENT DOCUMENTS

2011/0304217 A1* 12/2011 Yamamoto ............ B60L 11/182
 307/104
2012/0089202 A1* 4/2012 Staller ................ A61N 1/37229
 607/61
(Continued)

FOREIGN PATENT DOCUMENTS

EP  2390984  11/2011
KR  100698177  3/2007
WO  2014130065  8/2014

OTHER PUBLICATIONS

International Application No. PCT/US2016/039889, dated Jun. 28, 2016, International Search Report and Written Opinion.

*Primary Examiner* — Richard Isla
*Assistant Examiner* — Michael Dibenedetto
(74) *Attorney, Agent, or Firm* — Kunzler, PC.

(57) ABSTRACT

An apparatus for wireless power charging includes a first charging coil with a first conductor arranged in a winding pattern with a first winding around a center point and each successive winding of the first charging coil is further away from the center point than the first winding and any previous windings. A second charging coil includes a second conductor wound with respect to the first charging coil where each coil of the second charging coil is arranged between each winding of the first charging coil. The first charging coil and second charging coil are connected in parallel. A ferrite structure is positioned adjacent to the first charging coil and the second charging coil.

20 Claims, 8 Drawing Sheets

(51) Int. Cl.
*H02J 7/02* (2016.01)
*H02J 50/10* (2016.01)
*H02J 50/70* (2016.01)

(58) Field of Classification Search
CPC ........... H02J 17/00; H02J 7/205; H01F 38/14; H01F 41/041; H01F 41/042; H01F 41/046
USPC .......................................... 320/108; 307/104
See application file for complete search history.

(56) References Cited

U.S. PATENT DOCUMENTS

| | | |
|---|---|---|
| 2013/0236337 A1 | 9/2013 | Gummin et al. |
| 2014/0239729 A1* | 8/2014 | Covic ..................... H02J 17/00 307/104 |
| 2015/0091517 A1 | 4/2015 | Blum et al. |
| 2015/0145634 A1* | 5/2015 | Kurz ....................... H01F 38/14 336/232 |
| 2015/0155095 A1* | 6/2015 | Wu ......................... H02J 17/00 307/104 |
| 2015/0236546 A1* | 8/2015 | Kesler .................. H04B 5/0037 455/573 |
| 2016/0141097 A1* | 5/2016 | Oo ..................... H01F 27/2804 320/108 |

\* cited by examiner

LOW INDUCTANCE PAD WINDING USING A MATCHED WINDING OF MULTIPLE SPIRALS

FIELD

This application claims the benefit of U.S. Provisional Patent Application No. 62/186,257 entitled "LOW INDUCTANCE PAD WINDING USING A MATCHED WINDING OF MULTIPLE SPIRALS" and filed on Jun. 29, 2015 for Patrice Lethellier, et al., which is incorporated herein by reference for all purposes.

The inventions disclosed herein and the inventions of U.S. application Ser. No. 14/559,817, filed Dec. 3, 2014 were subject to a joint research agreement between Wireless Advance Electrification, Inc. a corporation of Utah, and Utah State University.

BACKGROUND

Wireless power transfer provides many advantages over wired power transfer. Many devices and systems use wireless power transfer to charge batteries, deliver power, etc. without having to use a connector, which may fail over time. Situations where a device may require intermittent power transfer, for example, to charge a battery can benefit from wireless charging to alleviate problems associated with connector failure, breaching a waterproof or water resistant barrier, etc.

As wireless power transfer systems grow, power levels have increased. Conventional high-power wireless power transfer systems may require relatively high voltages for charging. Methods of reducing voltage requirements are desirable to reduce cost, voltage hazards, etc.

SUMMARY

An apparatus for wireless power transfer is disclosed. The apparatus includes a first charging coil with a first conductor arranged in a winding pattern with a first winding around a center point and each successive winding of the first charging coil is further away from the center point than the first winding and any previous windings. A second charging coil includes a second conductor wound with respect to the first charging coil where each coil of the second charging coil is arranged between each winding of the first charging coil. The first charging coil and second charging coil are connected in parallel. A ferrite structure is positioned adjacent to the first charging coil and the second charging coil.

In one embodiment, each charging coil has an inner starting point. The inner starting point has a location where a first winding of a charging coil begins, and the first winding is closer to the center point than additional windings of the charging coil. The inner starting point of a charging coil for each charging coil is a same radius from the center point. In another embodiment, the inner starting point for each charging coil is spaced around a starting point circle equidistant from the inner starting point for other charging coils, the starting point circle centered about the center point.

In one embodiment, the apparatus includes an additional charging coil, and the additional charging coil includes an additional conductor wound with respect to the first charging coil, second charging coil, and any other additional charging coils, and each winding of an additional coil is arranged between each winding of the first charging coil and the second charging coil and any other additional charging coils, and each charging coil includes an inner starting point. The inner starting point is at a location where a first winding begins and the first winding is closer to the center point than additional windings of the charging coil. In the embodiment, the inner starting point for each charging coil is a same radius from the center point and the inner starting point for each charging coil is spaced around a starting point circle equidistant from the inner starting point for other charging coils. The starting point circle centered about the center point.

In one embodiment, each charging coil is wound so that at a particular radial from the center point each successive winding around an innermost winding is further from the previous winding and positioned substantially planar with respect to a line perpendicular to the center point. In another embodiment, each winding of each charging coil is arranged to be substantially planar. In another embodiment, each charging coil is arranged in an Archimedean spiral. In another embodiment, each charging coil is arranged in an irregular spiral, where the irregular spiral includes portions of a winding that vary in radius with respect to the center point other than variation between a starting point and an ending point of a winding to accommodate beginning of a next winding of the charging coil and to allow for windings of one or more additional charging coils. In a further embodiment, each charging coil is arranged in substantially a square shape and/or substantially a D-shape.

In one embodiment, at least a portion of a surface of the ferrite structure is planar and parallel to at least a portion of the first charging coil and second charging coil that are adjacent. In another embodiment, a side of the ferrite structure adjacent to the first charging coil and second charging coil is planar and the first charging coil and second charging coil are planar and are parallel to the side of the ferrite structure. In another embodiment, charging coils of the apparatus have a first portion positioned planar in a first plane and positioned adjacent to a section of the ferrite structure and the charging coils have a second portion positioned planar in a second plane and positioned adjacent to a planar section of the ferrite structure. The first plane and second plane are different planes. In another embodiment, the apparatus includes a second set of charging coils positioned adjacent to the first set of charging coils, where a portion of each of the first and second sets of charging coils are positioned adjacent and are positioned substantially in the first plane and portions of the first set of charging coils and the second set of charging coils positioned away from the adjacent sections of the first and second sets of charging coils are positioned substantially in the second plane.

In one embodiment, the conductor of each charging coil includes a first lead and a second lead. The first and second leads include portions of the conductor of each charging coil extending from windings of the charging coils. At least a portion of the first and second leads of each of the charging coils are grouped together in a pattern that adds inductance in addition to inductance of a winding portion of the charging coils or subtracts inductance from the inductance of a winding portion of the charging coils. The pattern is chosen to adjust a total amount of inductance of the charging coils. In another embodiment, ends of the first leads are connected and ends of the second leads are connected such that the charging coils are connected in parallel. In another embodiment, the ferrite structure includes a plurality of ferrite bars arranged in a radial pattern extending away from the center point.

An apparatus for wireless power transfer includes a first charging coil with a conductor arranged in a winding pattern with a first winding around a center point and each successive winding of the first charging coil is further away from the center point than the first winding and any previous windings. The apparatus includes one or more additional charging coils, where each charging coil includes a conductor wound with respect to the first charging coil where each coil of an additional charging coil is arranged between each winding of the first charging coil. The first charging coil and additional charging coils are connected in parallel.

Each charging coil has an inner starting point, where the inner starting point is at a location where a first winding of a charging coil begins and the first winding is closer to the center point than additional windings of the charging coil. The inner starting point for each charging coil is positioned a same radius from the center point. The inner starting point for each charging coil is spaced around a starting point circle equidistant from the inner starting point for other charging coils, and the starting point circle is centered about the center point. The first charging coil and the one or more additional charging coils are connected in parallel and the first charging coil and the one or more additional charging coils are substantially planar. The apparatus includes a ferrite structure positioned adjacent to the first charging coil and the one or more additional charging coils. At least one side of the ferrite structure is planar and is positioned adjacent to the first charging coil and the one or more additional charging coils.

A system for wireless power transfer includes a first charging coil with a first conductor arranged in a winding pattern with a first winding around a center point and each successive winding of the first charging coil is further away from the center point than the first winding and any previous windings. The system includes one or more additional charging coils, where each charging coil includes a conductor wound with respect to the first charging coil where each coil of an additional charging coil is arranged between each winding of the first charging coil. The first charging coil and additional charging coils are connected in parallel. The system includes a ferrite structure positioned adjacent to the first charging coil and the one or more additional charging coils, where the charging coils and ferrite structure are part of a charging pad. The system includes a resonant converter connected to the charging pad and providing power to the charging pad or a secondary circuit that receives power from the charging pad and conditions the power for a load.

In one embodiment, the charging pad is part of a primary charging pad and is connected to the resonant converter and the system includes a second charging pad. The second charging pad is connected to the secondary circuit. The system includes an energy storage device and/or a motor. The energy storage device and/or motor receive power from the secondary circuit.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
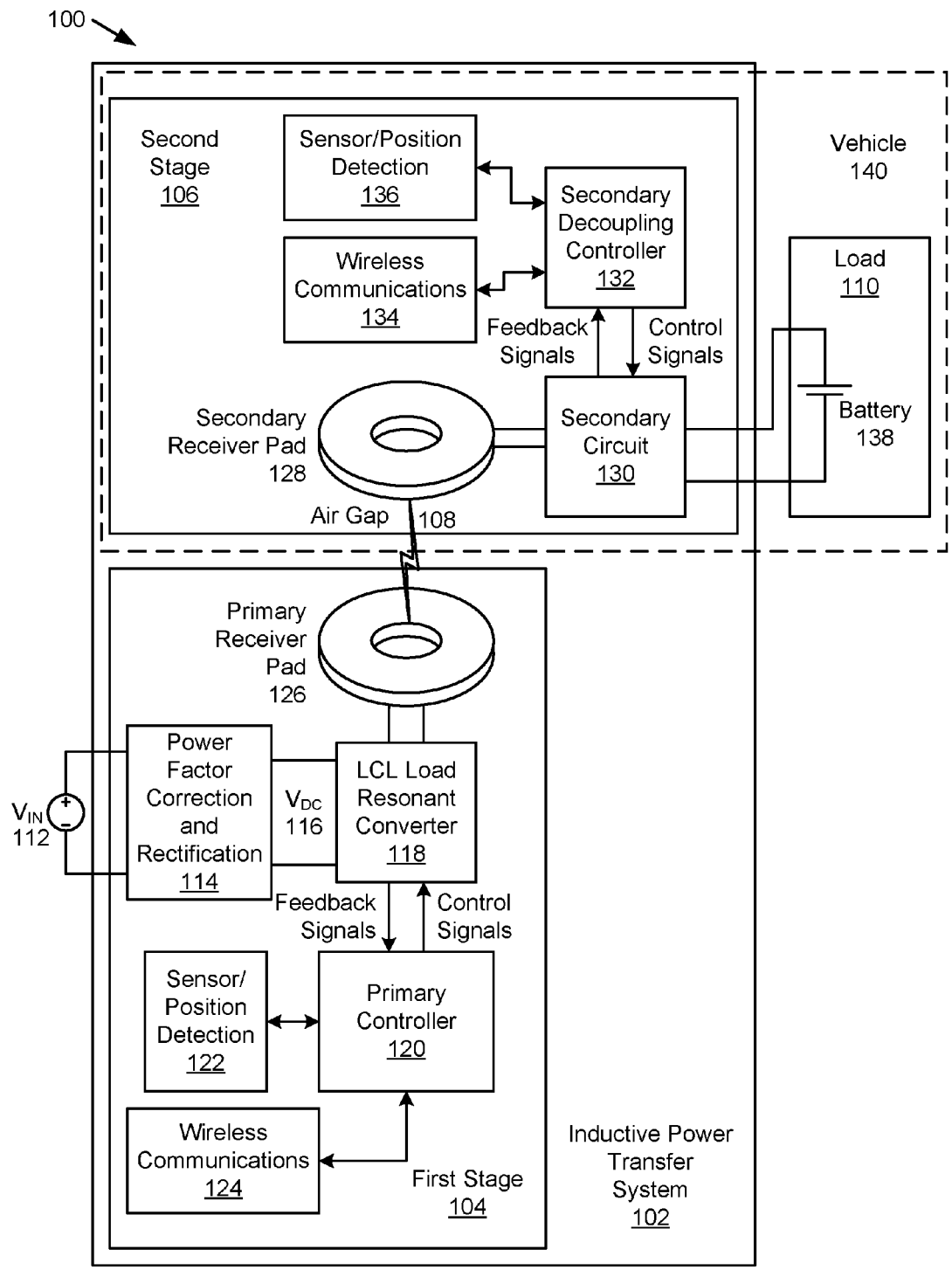
FIG. 1 illustrates a block diagram of an exemplary inductive power transfer ("IPT") charging system.

FIG. 1 illustrates a block diagram of an exemplary inductive power transfer ("IPT") charging system 100. The IPT charging system 100 of FIG. 1 is one embodiment of a system 100 that may include an IPT system 102, as described below. In other embodiments, the IPT system 102 may be used for purposes other than for charging. The IPT system 102 includes a first stage 104, a second stage 106, and wireless power transfer between the first stage 104 and second stage 106 over an air gap 108. The system 100 includes a load 110 and a voltage source 112. The elements of the system 100 are described below.

The IPT charging systems 100 described herein may include a power factor stage 114, such as a primary alternating current ("AC") to direct current ("DC") power factor stage, fed from a voltage source 112, such as from a utility power grid. In some embodiments, a primary AC-DC converter stage may be configured to convert grid-level voltages to a DC voltage 116, such as a DC bus voltage, for a primary tuned resonant converter. A DC output voltage with low output ripple is preferred to large ripple systems in order to prevent an amplitude modulated signal appearing in the wireless inductive power transfer system which can cause reduced efficiency and require additional complexity.

In some embodiments, active power factor correction ("PFC") in AC-DC converters may help to ensure the grid voltage and current are closely in phase. PFC may reduce overall grid current requirements and typically reduces grid harmonics. Grid power supply companies typically have certain harmonic requirements for attached industrial equipment. Often grid power supply companies also charge extra for power to industrial equipment that exhibits low power factor.

In the IPT charging system 100 described herein, one or more suitable stages may be used for PFC. For example, one or more commercial off-the-shelf ("COTS") AC-DC high efficiency power factor corrected converters may be used. The grid voltage source 112 may be a wide range of voltage inputs including, for example, single-phase 240 VAC, three-phase 208 VAC, or three-phase 480 VAC. In another embodiment, a 400 VDC output may be used for this stage and 400 VDC is typically an efficient output for a nominal grid input of single-phase 240 VAC grid input. A single-phase 240 VAC grid voltage with a 30 A circuit (suitable for a 5 kW IPT system) is commonplace in the United States even in areas that do not support industrial three-phase voltages, and may be used with the IPT system 100.

For the IPT charging system 100, in one embodiment, the first stage 104 includes an LCL load resonant converter 118 controlled by a primary controller 120 that may receive feedback signals from and may send control signals to the LCL load resonant converter 118. A primary controller 120 may receive information from alignment sensors for position detection 122 and may communicate using wireless communications 124. The LCL load resonant converter 118 is coupled to a primary receiver pad 126 coupled to a secondary receiver pad 128 over an air gap 108. The secondary receiver pad 128 is connected to a parallel decoupling pickup shown as a secondary circuit 130 controlled by a secondary decoupling controller 132 that may receive feedback signals and may send control signals to the secondary circuit 130. The secondary decoupling controller 132 may also communicate with alignment sensors for position detection 136 for control and may communicate wirelessly 134. The secondary circuit 130 may connect to a load 110, such as a battery 138 and may charge the battery 138. The battery 138 may provide power to another load, such as a motor controller (not shown). The second stage 106 and load 110 may be located in a vehicle 140.

Other embodiments of an IPT system 102 may include wireless power transfer for other purposes, such as battery charging for consumer electronic devices, such as a cellular phone, an electric razor, an electric toothbrush, and the like. One of skill in the art will recognize other uses for wireless power transfer and other IPT systems.

Figure 2A:
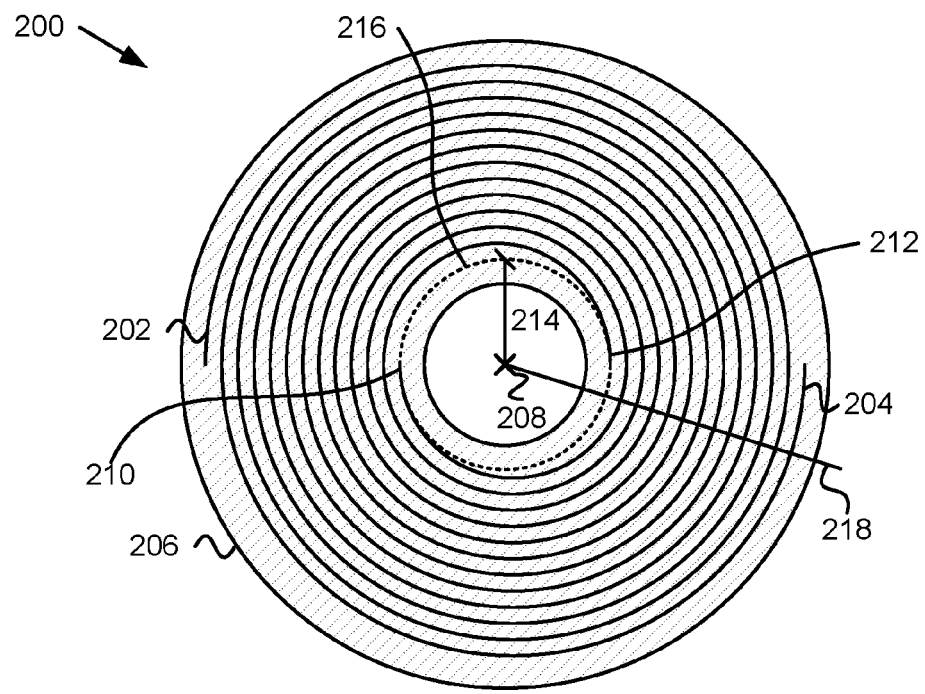
FIG. 2A is a schematic block diagram illustrating one embodiment of an apparatus for wireless power transfer with two charging coils and a ferrite structure.

FIG. 2A is a schematic block diagram illustrating one embodiment of an apparatus 200 for wireless power transfer with two charging coils and a ferrite structure. The apparatus 200 includes a first charging coil 202, a second charging coil 204, and a ferrite structure 206, which are described below.

The apparatus 200 includes a first charging coil 202 with a first conductor arranged in a winding pattern with a first winding around a center point 208 and each successive winding of the first charging coil is further away from the center point 208 than the first winding and any previous windings. The apparatus 200 also includes a second charging coil 204 with a second conductor wound with respect to the first charging coil 202 where each coil of the second charging coil 204 is arranged between each winding of the first charging coil 202. The first charging coil 202 and second charging coil 204 are connected in parallel. Connection of the first charging coil 202 and the second charging coil 204 in parallel is not shown for clarity. Typically leads from the charging coils 202, 204 are connected so that the charging coils 202, 204 are connected in parallel. While two charging coils 202, 204 are depicted in FIG. 2, additional charging coils may be included and are described below.

Advantageously, by splitting a charging coil into two charging coils 202, 204 and connecting the charging coils 202, 204 in parallel, inductance is reduced with respect to a non-split design. A lower inductance requires less voltage to drive the charging coils 202, 204 so voltage requirements are less on the primary receiver pad 126 to deliver a same amount of power to the secondary receiver pad 128. A lower voltage may then allow a designer to eliminate a transformer, user parts with a lower voltage rating, etc.

The charging coils 202, 204 each include a conductor that is typically insulated. The insulation is typically rated for expected voltages, including spikes, transients, etc. The insulation keeps the conductors from contacting each other and from other grounded or ungrounded structures. The insulation may include a varnish, thermoplastic, nylon, cross-linked polyethylene, rubber, and other insulation materials known in the art. The conductors may be solid or stranded and may be flexible or solid. In one embodiment, the conductors are a litz wire to reduce skin effect. The litz wire may include numerous strands of wire where each strand is insulated. One of skill in the art will recognize other wire types, insulation, etc. suitable for wireless charging.

The apparatus 200 also includes a ferrite structure 206 positioned adjacent to the first charging coil 202 and the second charging coil 204. The ferrite structure 206, in one embodiment, includes a planar surface positioned adjacent to the charging coils 202, 204. Typically the apparatus 200 is part of a charging pad, such as the primary receiver pad 126 or secondary receiver pad 128 and the ferrite structure 206 is designed to enhance a magnetic field above the charging coils 202, 204 to improve coupling with another receiver pad (e.g. 126, 128). The ferrite structure 206 is depicted as circular with an opening in the center of the ferrite structure 206, but one of skill in the art will recognize that other designs may be used for the ferrite structure. As used herein, "ferrite structure" includes any structure of a material that may be magnetized or that may be used in a transformer, such as the loosely coupled transformers formed by the primary receiver pad 126, the secondary receiver pad 128, and air gap 108 of FIG. 1, where current passing through charging coils (e.g. 202, 204) induces a magnetic field. The ferrite may include an iron oxide, a hematite, a magnetite, an oxide of other metals, or other ferromagnetic material.

Figure 2B:
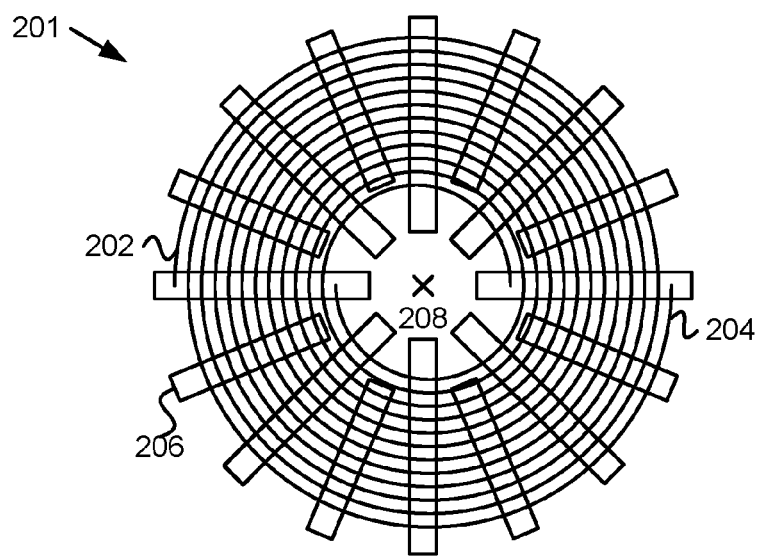
FIG. 2B is a schematic block diagram illustrating one embodiment of an apparatus for wireless power transfer with two charging coils and an alternate ferrite structure design.

For example, FIG. 2B is a schematic block diagram illustrating one embodiment of an apparatus 201 for wireless power transfer with two charging coils and an alternate ferrite structure design. The ferrite structure 206 depicted in the apparatus 201 of FIG. 2B includes ferrite bars arranged in a radial spoke design. The ferrite structure design depicted in FIG. 2B has been used successfully for wireless charging of vehicles.

In one embodiment, each charging coil 202, 204 had an inner starting point. The inner starting point 210 of the first charging coil 202 and the inner starting point 212 of the second charging coil 204 are shown in FIG. 2A. The inner starting point (e.g. 210) of a charging coil (e.g. 202) is at a location where a first winding of a charging coil 202 begins. The first winding is closer to the center point 208 than additional windings of the charging coil 202. The inner starting point of a charging coil for each charging coil is a same radius from the center point 208 to bring symmetry to the charging coils 202, 204. For example, the inner starting point 210 of the first charging coil 202 may have a radius 214 from the center point 208 and the inner starting point 212 of the second charging coil 204 also has the same radius 214 from the center point 208. By positioning the inner starting points 210, 212 at a same radius 214 from the center point 208, the charging coils 202, 204 may be constructed to be symmetrical about the center point 208, which may help in creating charging coils of a similar or same inductance.

In another embodiment, the inner starting point for each charging coil is spaced around a starting point circle 216 equidistant from the inner starting point for other charging coils. The starting point circle 216 is centered about the center point 208, and in one embodiment, has a radius 214 that is the same radius 214 as the inner starting points 210, 212 of the charging coils 202, 204. For example, with two charging coils, e.g. the first charging coil 202 and the second charging coil 204, the inner starting points 210, 212 are 180 degrees apart around the starting point circle 216. For three charging coils the inner starting points may be spaced 120 degrees apart, for four charging coils the inner starting points may be spaced 90 degrees apart, etc.

In one embodiment, each charging coil 202, 204 is wound so that at a particular radial 218 from the center point 208, each successive winding around an innermost winding is further from the previous winding and positioned substantially planar with respect to a line perpendicular to the center point 208 so that the plane is perpendicular to the line. For example, the charging coils 208 may be arranged as in FIGS. 2A, 2B, 3, and 4 where the charging coils 202, 204, etc. are arranged next to each other in a same plane so that each winding of each charging coil 202, 204 is arranged to be substantially planar. In another embodiment, at least some of the windings are positioned in a different plane. For example, some of the windings may be stacked on top of windings adjacent to the ferrite structure 206. When windings are in different planes, in one embodiment, the charging coils 202, 204 each have a same winding in a different plane to maintain symmetry.

Figure 3:
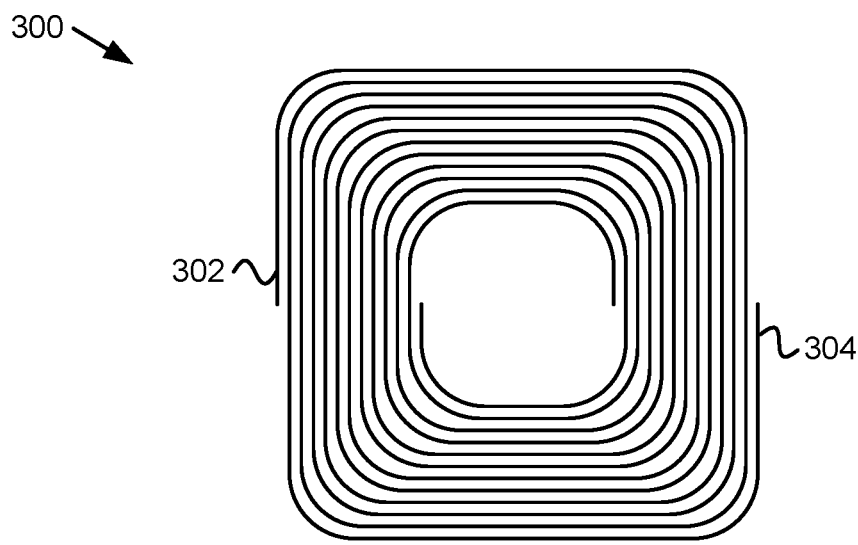
FIG. 3 is a schematic block diagram illustrating one embodiment of an apparatus for wireless power transfer with two charging coils in a square pattern.

In one embodiment, each charging coil 202, 204 is arranged in an Archimedean spiral. An Archimedean spiral, also known as an arithmetic spiral, is constructed of a locus of points corresponding to the locations over time of a point moving away from a center point 208 with a constant speed along a line which rotates with constant angular velocity. In another embodiment, each charging coil 202, 204 is arranged in an irregular spiral. The irregular spiral may include portions of a winding that vary in radius with respect to the center point 208 other than variation between a starting point and an ending point of a winding to accommodate beginning of a next winding of the charging coil and to allow for windings of one or more additional charging coils. FIG. 3 is an example of an irregular spiral. FIG. 3 a schematic block diagram illustrating one embodiment of an apparatus 300 for wireless power transfer with two charging coils 302, 304 in a square pattern. Other irregular spirals may also be used, such as a D-shaped pattern. One of skill in the art will recognize other designs that include multiple charging coils connected in parallel.

Figure 4:
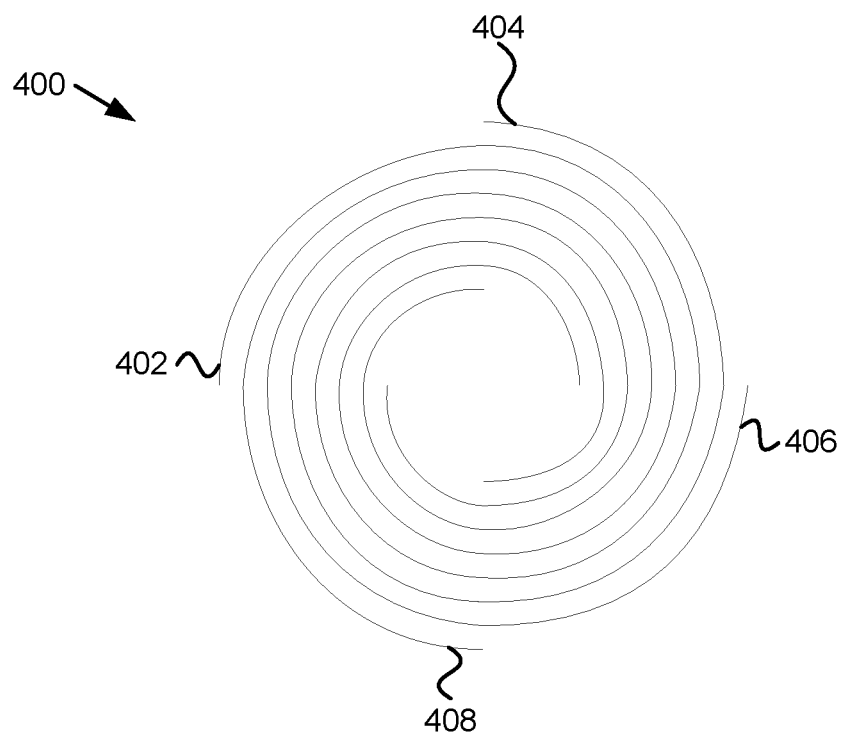
FIG. 4 is a schematic block diagram illustrating one embodiment of an apparatus for wireless power transfer with four charging coils.

As described above, other designs may include more than two charging coils. FIG. 4 is a schematic block diagram illustrating one embodiment of an apparatus 400 for wireless power transfer with four charging coils 402, 404, 406, 408. Other designs may include three charging coils, five charging coils, or more.

Note that the multiple coil design may include a non-integer number of turns because the ending point of a charging coil (e.g. 202) may be anywhere with respect to the inner starting point (e.g. 210). If a coil design with one charging coil has 11 turns, where a coil design has two charging coils (e.g. 202, 204), each can have 5.5 turns. Also, for a two charging coil design, the self inductance of each charging coil is roughly four times less than the self inductance of a design with a single charging coil. Comparing a single charging coil design and a two charging coil design, self inductance is related by equation (1).

$$L \cong \frac{L_{orig}}{4} \quad (1)$$

However, the two split spiral charging coils are mutually coupled and the coupling coefficient is typically quite high and close to 1, then the mutual inductance between the two charging coils (e.g. 202, 204) is nearly the same as the self inductance. As a result, if the two charging coils 202, 204 are excited with the same phase current, the equivalent self inductance is:

$$L_{eq} = L + M \cong 2L = \frac{L_{orig}}{2} \quad (2)$$

If the two coils are connected in parallel (Leq∥Leq), the resulting inductance is roughly 4 times the original. For N split coils, the new pad inductance reduces by $N^2$. Using this unique method of splitting the Archimedean spiral, the self inductances of the charging coils are nearly identical. This is beneficial because if there is a mismatch (e.g. between L1 and L2 in FIG. 5), then the mismatch may cause the currents in the charging coils to be out of phase if there is a reflected load from the secondary to the primary pad. Hence, there could be real power transfer between the two split coils which is non-ideal as the current between the split charging coils or resulting power is not beneficial.

Figure 5:
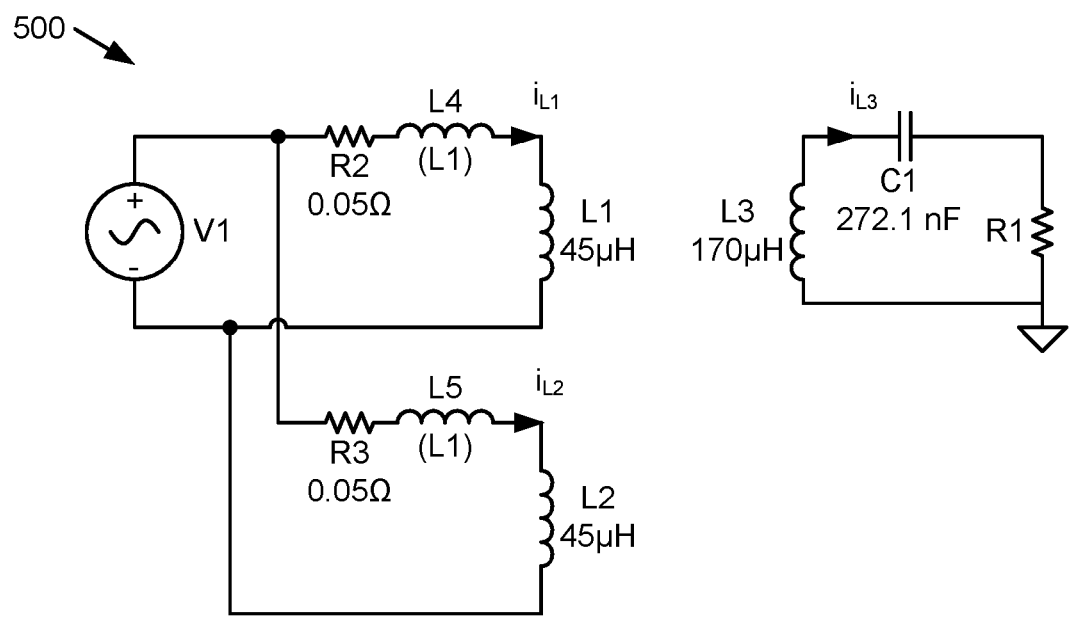
FIG. 5 is a schematic block diagram illustrating one embodiment of a circuit for simulating wireless power transfer with two charging coils and a receiver coil.

FIG. 5 is a schematic block diagram illustrating one embodiment of a circuit 500 for simulating wireless power transfer with two charging coils and a receiver coil. The circuit 500 includes mutual inductance L1, L2, and L3. L1 is associated with a first charging coil 202, L2 is associated with a second charging coil, and L3 is part of a secondary receiver pad. The first charging coil 202 includes a leakage inductance L4 that is a function of L1, and the second charging coil includes a leakage inductance L5 that is also a function of L1. The first and second charging coils each include a resistance R2 and R3 that represents a parasitic coil resistance. The secondary receiver pad includes a load resistor R1 and a capacitor C1 where R1, L3 and C1 form a resonant secondary circuit.

Figure 6A:
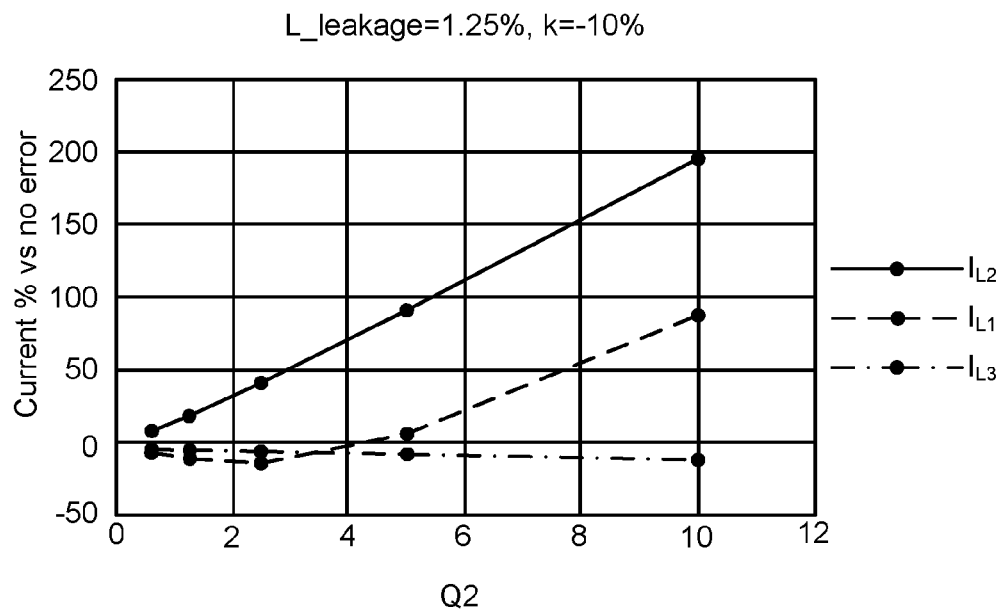
FIG. 6A is a depiction of simulation results for percent current versus no error for leakage inductance of 1.25% and quality factor is varied.
Figure 6B:
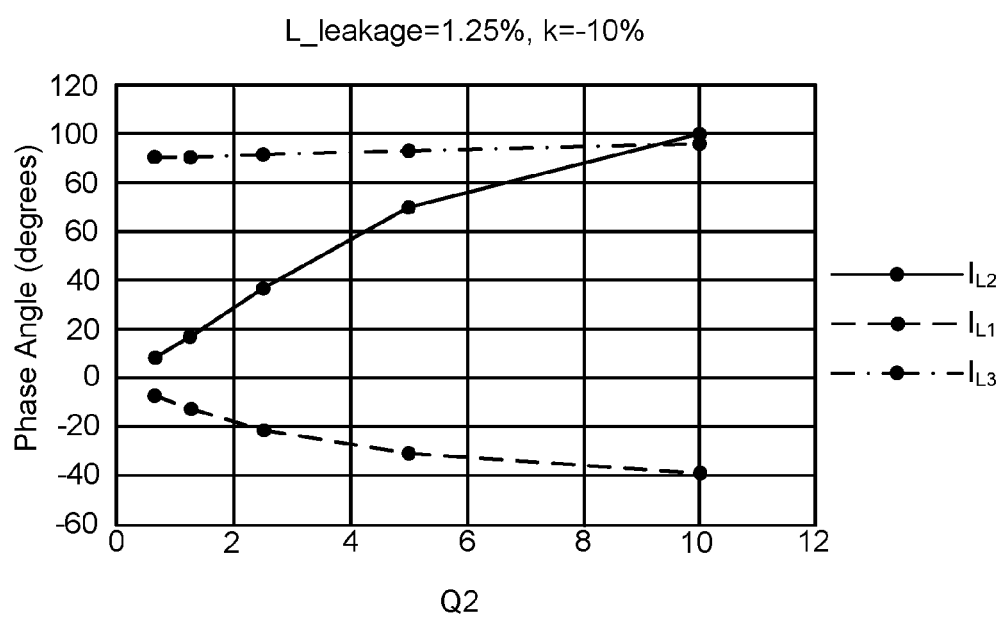
FIG. 6B is a depiction of simulation results for phase angle for leakage inductance of 1.25% and quality factor is varied.

A consideration for a split charging coil design is if there is any imbalance in coupling between the split primary charging coils to the secondary charging coil, especially if there is misalignment between the charging coils, and the center of the two Archimedean spirals are not perfectly matched due to the splitting technique. A study comparison of a coupling variation k of 10% between the coils L1 and L2 of FIG. 5 is shown in FIG. 6A. The vertical axis in FIG. 6A is percent current mismatch versus no error where no error is represented as zero, and Q2 is plotted along the horizontal axis. FIG. 6B has phase angle of the currents of the circuit 500 in FIG. 5 on the vertical axis and Q2 variation is on the horizontal axis. The horizontal axis, labeled Q2, is a quality factor of the secondary circuit, which corresponds to an amount of power provided to the load R1. As Q2 increases, more power is transferred to the secondary and to the load. While Q2 is shown to increase to 10, typically Q2 would be lower and is usually less than 5.

As can be seen in FIG. 6A, the current percent mismatch between the two charging coils compared to initial normalized data is higher as Q2 is increased in the circuit 500 of FIG. 5. Therefore, the higher the quality factor Q2 in the resonant circuit on the secondary, the worse the current mismatch. In addition, both currents $i_{L1}$ and $i_{L2}$ increase, which is not ideal compared to the normalized value. It should also be noted that the phase between the charging coils, as shown FIG. 6B, is also very significant which means both coils are transferring power with each other. As the phase difference between $i_{L1}$ and $i_{L2}$ increases to 90 degrees, more current is transferred between the first and second charging coils.

Figure 7A:
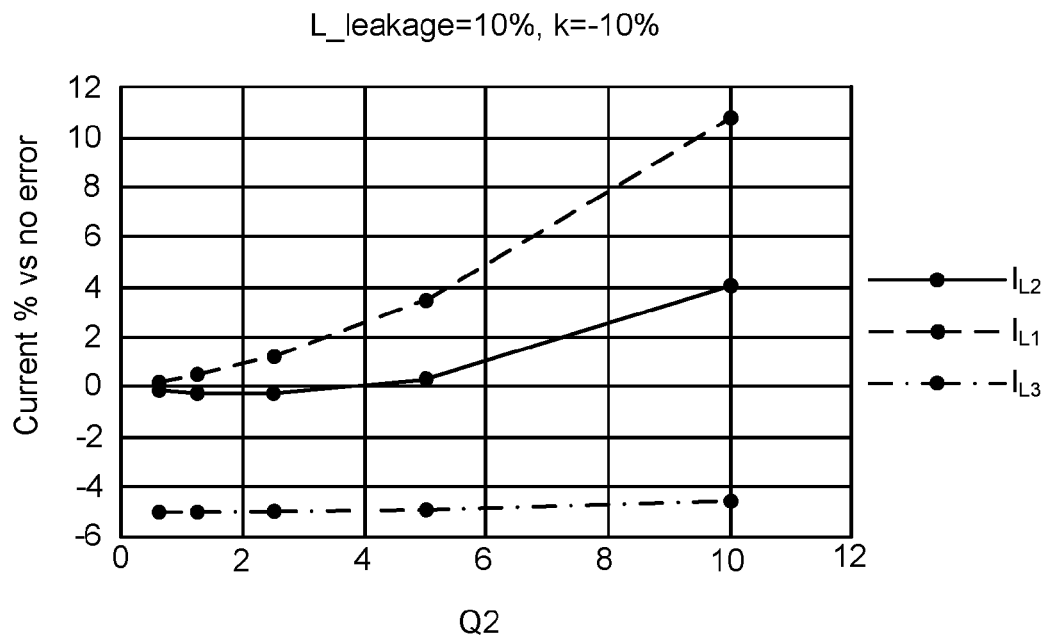
FIG. 7A is a depiction of simulation results for percent current versus no error for leakage inductance of 10% and quality factor is varied.
Figure 7B:
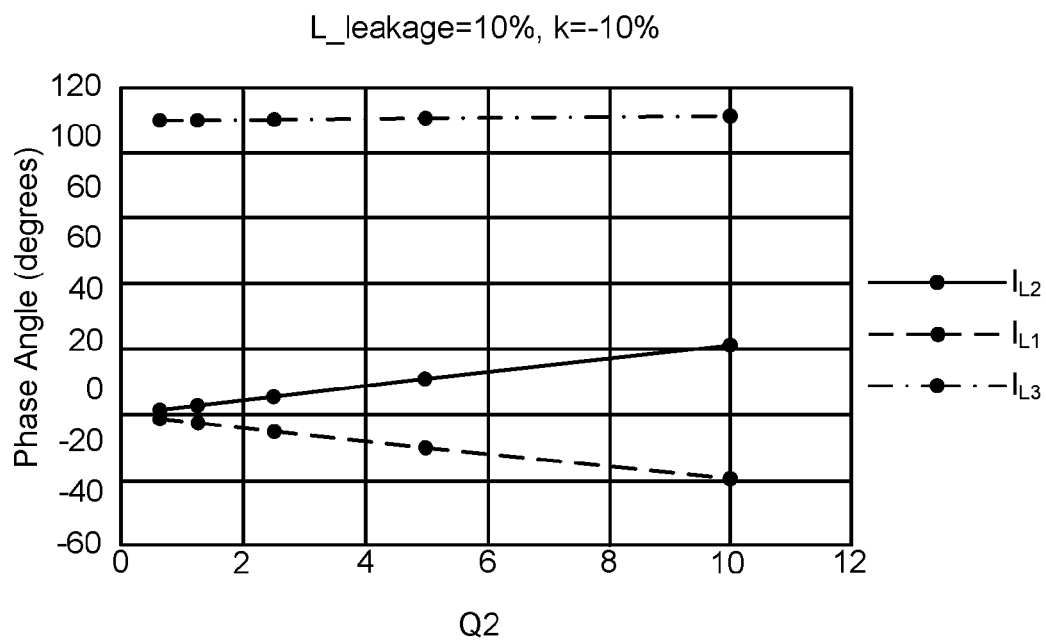
FIG. 7B is a depiction of simulation results for phase angle for leakage inductance of 10% and quality factor is varied.

FIG. 7A is the same as FIG. 6A, except leakage inductance is changed to 10 percent. FIG. 7B depicts phase angle of the currents in FIG. 7A for the same simulation as FIG. 7A. In practice that the leakage inductance in each pad significantly helps reduce the current mismatch between the charging coils on the primary. If the leakage inductance is increased to 10%, then the current mismatch between $i_{L1}$ and $i_{L2}$ nearly reduces to a negligible amount, as shown in FIG. 7A and 7B. In practice, leakage inductance of around 25% may be encountered. Hence, the simulations of FIGS. 6A, 6B, 7A and 7B show that controlling the leakage inductance between the coils helps to reduce current imbalance.

Figures 8A, 8B, 8C:
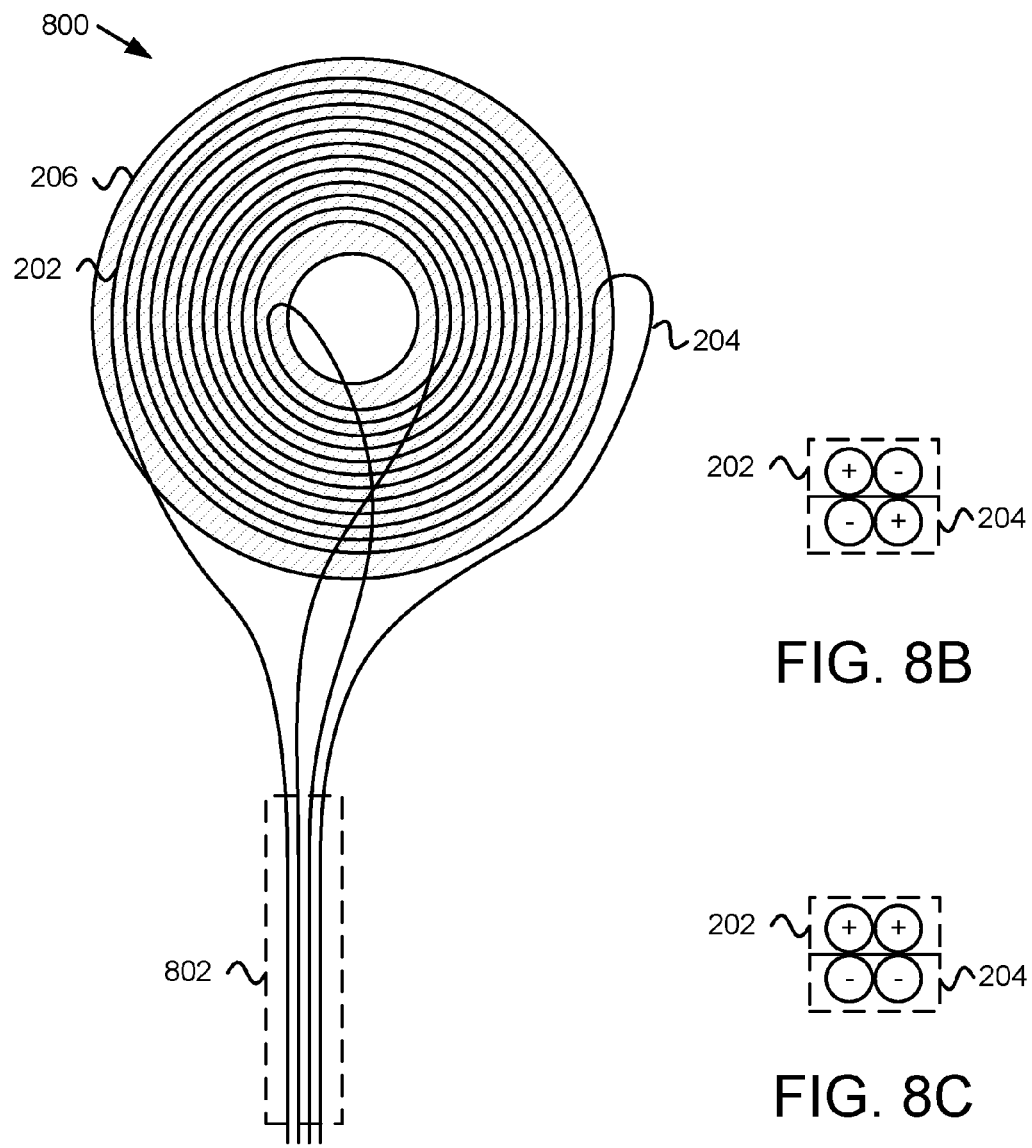
FIG. 8A is a schematic block diagram illustrating one embodiment of an apparatus for wireless power transfer with two charging coils and a ferrite structure and first and second conductors of the charging coils.
FIG. 8B is a cross section of the power leads of the first and second conductors of the apparatus of FIG. 8A with a first polarity.
FIG. 8C is a cross section of the power leads of the first and second conductors of the apparatus of FIG. 8A with a second polarity.

Another method to control leakage inductance of the first charging coil 202 and second charging coil 204 is proposed. FIG. 8A is a schematic block diagram illustrating one embodiment of an apparatus 800 for wireless power transfer with two charging coils 202, 204 and a ferrite structure 206 and first and second conductors of the charging coils 202, 204. Power leads 802 that include the first and second conductors of the charging coils 202, 204 typically run to other components of the first stage 104, for example to other elements of the LCL load resonant converter 118 if the first stage 104 includes an LCL load resonant converter topology. FIG. 8B is a cross section of the power leads of the first and second conductors of the apparatus 800 of FIG. 8A with a first polarity. FIG. 8C is a cross section of the power leads of the first and second conductors of the apparatus 800 of FIG. 8A with a second polarity. In FIG. 8B and 8C, the first conductor of the first charging coil 202 are displayed on top and the second conductor of the second charging coil 204 are shown on the bottom. A "+" sign indicates current flow in one direction and a "−" sign indicates current flow in the opposite direction.

Controlling inductance of the power leads 802 may be useful to adjust inductance of the charging coils 202, 204. FIG. 8B shows a configuration of the first and second conductors that helps to cancel inductance of the power leads 802, and FIG. 8C shows a configuration that will increase inductance of the power leads 802. Both configurations may be used depending on the situation. For example, part of the power leads 802 may be grouped as shown in FIG. 8A and part may be grouped as shown in FIGS. 8B. In any design, introducing extra inductance is typically non-ideal as this reduces the overall coupling between the equivalent primary pad to secondary pad, however, introducing some leakage pad inductance is beneficial as seen above with respect to FIGS. 5, 6A, 6B, 7A and 7B. Hence a tradeoff may be used during actual design.

A test apparatus (not shown) such as the apparatus 201 depicted in FIG. 2B was constructed where the ferrite structure of the test apparatus was similar in design to the ferrite structure 206 of the apparatus 201 of FIG. 2B, but with more ferrite bars than depicted in FIG. 2B. A secondary receiver pad (e.g. 128) was constructed with a single coil connected to a secondary circuit (e.g. 130) and a load (e.g. 110). Measurements were taken for various positions of the secondary receiver pad 128. Open circuit and short circuit inductances were measured using an LCR meter at 23.4 kilo hertz ("kHz") and an Ls-Rs setting. In test results, the first charging coil 202 is denoted by an "A," the second charging coil 204 is denoted by a "B," and the secondary receiver pad 128 is denoted with an "S."

Self inductance $L_A$ is determined by measuring inductance of the first charging coil 202 while the second charging coil 204 and the secondary receiver pad 128 are open circuited. Self inductance $L_B$ is determined by measuring inductance of the second charging coil 204 while the first charging coil 202 and the secondary receiver pad 128 are open circuited. Mutual inductance $L_{AB}$ is measured on the first charging coil 202 while the second charging coil 204 is shorted and the secondary receiver pad 128 is not present. Mutual inductance $L_{AS}$ is measured on the first charging coil 202 with secondary receiver pad 128 short circuited and the second charging coil 204 open circuited. Mutual inductance $L_{BS}$ is measured on the second charging coil 204 with secondary receiver pad 128 short circuited and the first charging coil 202 open circuited. Mutual inductance $L_{S1}$ is measured on the secondary receiver pad 128 with the first and second charging coils 202, 204 short circuited. Self inductance $L_{S2}$ is measured on the secondary receiver pad $L_{S2}$ with the first and second charging coils 202, 204 open circuited. The results are shown in Table 1.

"Z" is the height of the air gap 108, and "X" and "Y" are horizontal variations of the secondary receiver pad 128 with respect to a fixed primary receiver pad 126 with the first and second charging coils 202, 204. Coupling coefficients were then calculated from the measured self and mutual inductances. "$k_{AS}$" is the coupling coefficient between the first charging coil 202 and the secondary receiver pad 128 and "$k_{BS}$" is the coupling coefficient between the second charging coil 204 and the secondary receiver pad 128. "$k_2$" is the coupling coefficient between the secondary receiver pad 128 and the combined inductance of the first and second charging coils 202, 204.

TABLE 1

| X | Y | Z | $k_{AS}$ | $k_{BS}$ | $k_2$ |
|---|---|---|---|---|---|
| 0 | 0 | 6.21 | 0.315 | 0.318 | 0.340 |
| 0 | 6 | 6.21 | 0.251 | 0.246 | 0.267 |
| 6 | 0 | 6.21 | 0.255 | 0.254 | 0.266 |
| 4.25 | 4.25 | 6.21 | 0.260 | 0.256 | 0.276 |
| 0 | 0 | 8.21 | 0.239 | 0.233 | 0.256 |
| 0 | 4 | 8.21 | 0.231 | 0.219 | 0.231 |
| 4 | 0 | 8.21 | 0.221 | 0.227 | 0.234 |
| 2.75 | 2.75 | 8.21 | 0.224 | 0.207 | 0.240 |
| 0 | 0 | 7.21 | 0.278 | 0.273 | 0.294 |
| 0 | 5 | 7.21 | 0.239 | 0.240 | 0.258 |
| 5 | 0 | 7.21 | 0.233 | 0.237 | 0.252 |
| 2.75 | 2.75 | 7.21 | 0.241 | 0.237 | 0.259 |

From Table 1, mismatch in coupling between the primary receiver pad 126 with first and second charging coils and the secondary receiver pad 128 is much less than 10 percent. In practice, throughout all the misalignment conditions in the X/Y plane, it was found that at maximum misalignment, coupling is around 5%. In practice, it was also found that the coupling between the two primary charging coils 202, 204 is around 0.75 which means leakage inductance on a real system is more likely to be around 25%. This is true even while using the inductance cancellation scheme in FIG. 8C for 30 feet of power leads 802.

When the test system was energized under full power and under worst case misalignment conditions at maximum output power on the secondary, the observed mismatch in primary current was less than 5%. This is negligible for practical pad systems. Hence, by using this technique the drive voltage for the resonant stage was reduced by half and eliminated an expensive transformer, without much downside to the overall system.

One other advantage of using split charging coils wired in parallel is that each primary split charging coil can be energized by a modular H-bridge, or other converter stage, and is stackable. This would require the converter stages to be synchronized, but the system would have a high operational availability with N+1 redundancy, meaning that if one converter stage failed (e.g. as an H-bridge converter stage) out of N stages, then the system can continue to operate with N−1 stages, or for N+1 stages and N stages running, if one stage failed, a backup stage may automatically take over.

Figure 9A:
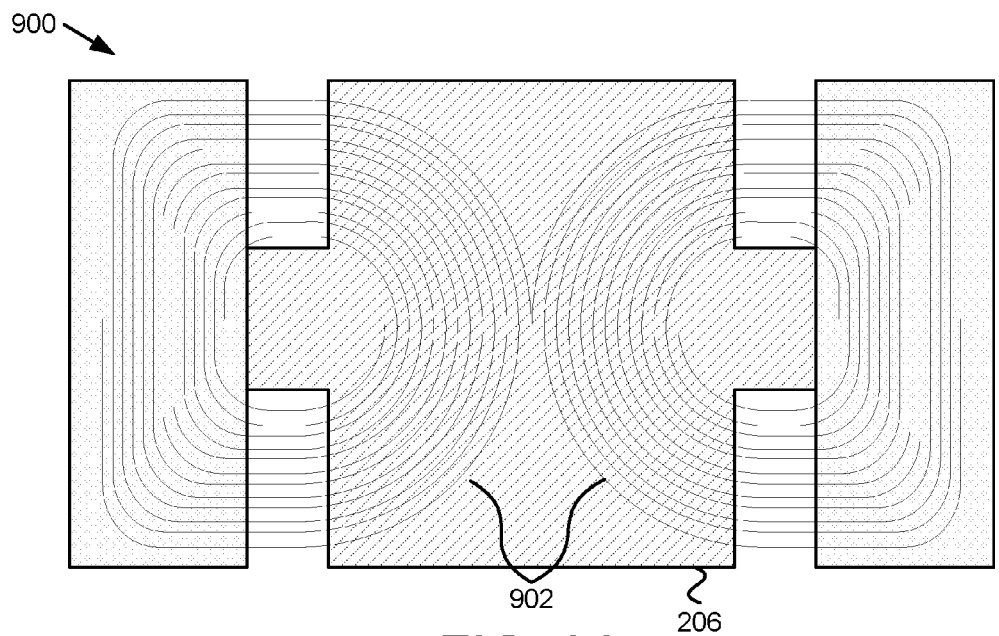
FIG. 9A is a top view of a schematic block diagram illustrating one embodiment of an apparatus for wireless power transfer with two sets of charging coils arranged in a double-D pattern.
Figure 9B:
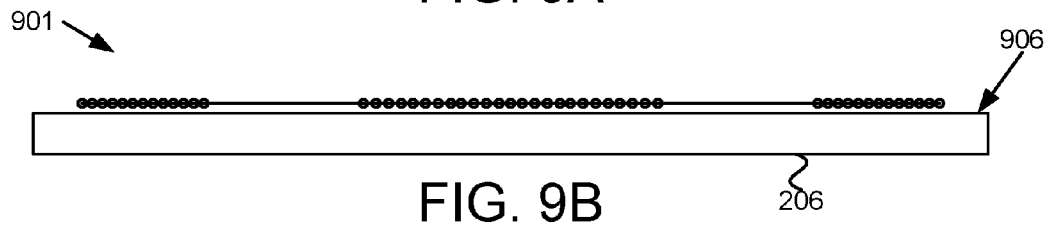
FIG. 9B is a side view of a schematic block diagram illustrating one embodiment of an apparatus for wireless power transfer with two sets of charging coils arranged in a double-D pattern with a ferrite structure below the charging coils.

A split charging coil design may also be used for other charging coil configurations. FIG. 9A is a top view of a schematic block diagram illustrating one embodiment of an apparatus 900 for wireless power transfer with two sets of charging coils 904 arranged in a double-D pattern. Note that while the apparatus 900 of FIG. 9A is arranged as a double-D, other patterns may also be used, such as two square patterns, as depicted in FIG. 3, two circular patterns as depicted in FIGS. 2A and 2B, etc. The apparatus 900 includes a ferrite structure 206 that is customized based on how the charging coils 904 are arranged. For example, the charging coils 904 may be arranged as shown in FIG. 9B, which is a side view of a schematic block diagram illustrating one embodiment of an apparatus 901 for wireless power transfer with two sets of charging coils 904 arranged in a double-D pattern with a ferrite structure 206 below the charging coils 904. In the embodiment, the surface of the ferrite structure 206 is planar and forms a first plane 906 and is parallel to the charging coils 904, which are adjacent. In the embodiment, FIG. 9A may be a top view and FIG. 9B may be a side view of the same apparatus 900, 901. In the embodiment, the ferrite structure 206 may be a solid piece of ferrite or may have an alternate design.

Figure 9C:
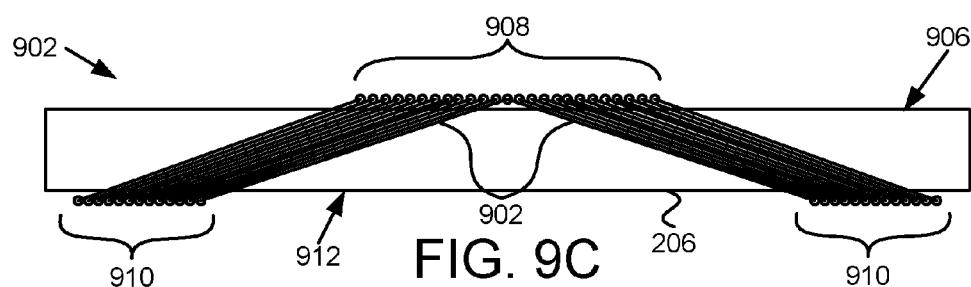
FIG. 9C is a side view of a schematic block diagram illustrating one embodiment of an apparatus for wireless power transfer with two sets of charging coils arranged in a double-D pattern with a portion of the charging coils above a ferrite structure and a portion of the charging coils below the ferrite structure.

FIG. 9C is a side view of a schematic block diagram illustrating one embodiment of an apparatus 902 for wireless power transfer with two sets of charging coils 904 arranged in a double-D pattern with a portion 908 of the charging coils 904 above a ferrite structure 206 and a portion 910 of the charging coils 904 below the ferrite structure 206. In the embodiment, FIG. 9A may be a top view and FIG. 9C may be a side view of the same apparatus 900, 902. In the embodiment, the ferrite structure 206 may be a solid piece of ferrite or may have an alternate design. The ferrite structure 206 is depicted as thick merely to illustrate how the charging coils 904 may be arranged and wound from top to bottom of the ferrite structure. In the embodiment, charging coils 904 of the apparatus 900, 902 include a first portion 908 positioned planar in a first plane 906 and positioned adjacent to a section of the ferrite structure 206 and the charging coils 904 include a second portion 910 positioned planar in a second plane 912 and positioned adjacent to a planar section of the ferrite structure 206, where the first plane 906 and second plane 912 are different planes. The ferrite structure 206 may include openings for the charging coils 904 to pass to the second plane 912.

Figure 9D:
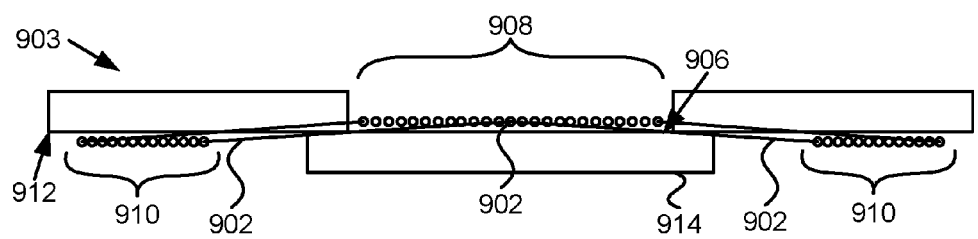
FIG. 9D is a side view of a schematic block diagram illustrating one embodiment of an apparatus for wireless power transfer with two sets of charging coils arranged in a double-D pattern with a portion of the charging coils above a ferrite structure and a portion of the charging coils below the ferrite structure and a split ferrite structure.

FIG. 9D is a side view of a schematic block diagram illustrating one embodiment of an apparatus 903 for wireless power transfer with two sets of charging coils 904 arranged in a double-D pattern with a portion 908 of the charging coils 904 above a ferrite structure 914 and a portion 910 of the charging coils 904 below the ferrite structure 914 and a split ferrite structure 914. In the embodiment, FIG. 9A may be a top view and FIG. 9D may be a side view of the same apparatus 900, 903. In the embodiment, the ferrite structure 206 may be split as depicted in FIG. 9D. In the embodiment, charging coils 904 of the apparatus 900, 902 include a first portion 908 positioned planar in a first plane 906 and positioned adjacent to a section of the ferrite structure 206 and the charging coils 904 include a second portion 910 positioned planar in a second plane 912 and positioned adjacent to a planar section of the ferrite structure 206, where the first plane 906 and second plane 912 are different planes.

Also in the embodiments of FIGS. 9A, 9C and FIGS. 9A, 9D, a second set of charging coils is positioned adjacent to the first set of charging coils, where a portion of each of the first and second sets of charging coils 904 are positioned adjacent to each other and are positioned substantially in the first plane 906 and portions of the first set of charging coils and the second set of charging coils positioned away from the adjacent sections of the first and second sets of charging coils 904 are positioned substantially in the second plane 912.

An embodiment of FIG. 9A is advantageous because having two sets of charging coils 904 positioned adjacent increases a magnetic field height above the charging coils 904 compared to a design as shown in FIG. 2A or 2B. The portion 908 of the two sets of charging coils 904 in the center of the ferrite structures 206, 914 causes an increased magnetic field above the charging coils 904. The portions 910 of the charging coils 904 away from the center of the ferrite structures 206, 914 are less desirable so by placing portions 910 under the ferrite structures 206, 914 and away from the portion 908 in the center helps to avoid these portions 910 from interfering magnetically with the magnetic field above the portions 908 of the charging coils 904 in the center.

However, the design of FIG. 9C increases thickness of the charging pad apparatus 902 over a design as depicted in FIG. 9B. The split ferrite structure 914 of the apparatus 903 of FIG. 9D may be thinner than the apparatus 902 of FIG. 9C, which is desirable. While FIG. 9A depicts an opening in the ferrite structure 206 for the charging coils 904, other ferrite structure designs may be used. For example, the charging coils 904 may be wound around the edges of the ferrite structures 206, 914 or the ferrite structures 206, 914 may be constructed of ferrite bars. One of skill in the art will recognize other ferrite structure designs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a first charging coil comprising a first conductor arranged in a winding pattern with a first winding around a center point and each successive winding of the first charging coil is further away from the center point than the first winding and any previous windings;
    a second charging coil comprising a second conductor wound with respect to the first charging coil where each coil of the second charging coil is arranged between each winding of the first charging coil, wherein the first charging coil and second charging coil are connected in parallel; and
    a ferrite structure positioned adjacent to the first charging coil and the second charging coil,
    wherein the first charging coil and the second charging coil are wound in a same direction, and
    wherein each charging coil comprises an inner starting point located closer to the center point than each successive winding of the charging coil, and wherein the inner starting point for each charging coil is a same radius from the center point and the inner starting point of the first charging coil is separated from the inner starting point of the second charging coil in a direction radially around the center point.

2. The apparatus of claim 1, wherein the inner starting point of the first charging coil is spaced around a starting point circle equidistant from the inner starting point for of the second charging coil, the starting point circle centered about the center point.

3. The apparatus of claim 1, further comprising an additional charging coil, the additional charging coil comprising an additional conductor wound with respect to the first charging coil, second charging coil, and any other additional charging coils where each winding of an additional coil is arranged between each winding of the first charging coil and the second charging coil and any other additional charging coils.

4. The apparatus of claim 3, wherein each charging coil comprises an inner starting point, the inner starting point comprising a location where a first winding begins, the first winding closer to the center point than additional windings of the charging coil, wherein the inner starting point for each charging coil is a same radius from the center point, and wherein the inner starting point for each charging coil is spaced around a starting point circle equidistant from the inner starting point for other charging coils, the starting point circle centered about the center point.

5. The apparatus of claim 1, wherein each charging coil is wound so that at a particular radial from the center point each successive winding around an innermost winding is further from the previous winding and positioned substantially planar with respect to a line perpendicular to the center point.

6. The apparatus of claim 5, wherein each winding of each charging coil is arranged to be substantially planar.

7. The apparatus of claim 5, wherein each charging coil is arranged in an Archimedean spiral.

8. The apparatus of claim 5, wherein each charging coil is arranged in an irregular spiral, wherein the irregular spiral comprises portions of a winding that vary in radius with respect to the center point other than variation between a starting point and an ending point of a winding to accommodate beginning of a next winding of the charging coil and to allow for windings of one or more additional charging coils.

9. The apparatus of claim 8, wherein each charging coil is arranged in one or more of substantially a square shape and substantially a D-shape.

10. The apparatus of claim 1, wherein at least a portion of a surface of the ferrite structure is planar and parallel to at least a portion of the first charging coil and second charging coil that are adjacent.

11. The apparatus of claim 10, wherein a side of the ferrite structure adjacent to the first charging coil and second charging coil is planar and the first charging coil and second charging coil are planar and are parallel to the side of the ferrite structure.

12. The apparatus of claim 10, wherein charging coils of the apparatus comprise a first portion positioned planar in a first plane and positioned adjacent to a section of the ferrite structure and the charging coils comprise a second portion positioned planar in a second plane and positioned adjacent to a planar section of the ferrite structure, wherein the first plane and second plane are different planes.

13. The apparatus of claim 12, wherein the charging coils comprise a first set of charging coils and further comprising a second set of charging coils positioned adjacent to the first set of charging coils, wherein a portion of each of the first and second sets of charging coils are positioned adjacent and are positioned substantially in the first plane and portions of the first set of charging coils and the second set of charging coils positioned away from the adjacent sections of the first and second sets of charging coils are positioned substantially in the second plane.

14. The apparatus of claim 1, wherein the conductor of each charging coil comprises a first lead and a second lead, the first and second leads comprise portions of the conductor of each charging coil extending from windings of the charging coils, wherein at least a portion of the first and second leads of each of the charging coils are grouped together in a pattern that one of
  adds inductance in addition to inductance of a winding portion of the charging coils; and
  subtracts inductance from the inductance of a winding portion of the charging coils, wherein the pattern is chosen to adjust a total amount of inductance of the charging coils.

15. The apparatus of claim 1, wherein the conductor of each charging coil comprises a first lead and a second lead, the first and second leads comprise portions of the conductor of each charging coil extending from windings of the charging coils, wherein ends of the first leads are connected and ends of the second leads are connected such that the charging coils are connected in parallel.

16. The apparatus of claim 1, wherein the ferrite structure comprises a plurality of ferrite bars arranged in a radial pattern extending away from the center point.

17. An apparatus comprising:
  a first charging coil comprising a conductor arranged in a winding pattern with a first winding around a center point and each successive winding of the first charging coil is further away from the center point than the first winding and any previous windings;
  one or more additional charging coils, each charging coil comprising a conductor wound with respect to the first charging coil where each coil of an additional charging coil is arranged between each winding of the first charging coil, wherein the first charging coil and additional charging coils are connected in parallel,
  wherein the first charging coil and the second charging coil are wound in a same direction, and
  wherein each charging coil comprises an inner starting point located closer to the center point than each successive winding of the charging coil,
  wherein the inner starting point for each charging coil is positioned a same radius from the center point,
  wherein the inner starting point for each charging coil is spaced around a starting point circle equidistant from the inner starting point for other charging coils, the starting point circle centered about the center point,
  wherein the first charging coil and the one or more additional charging coils are connected in parallel,
  wherein the first charging coil and the one or more additional charging coils are substantially planar; and
  a ferrite structure positioned adjacent to the first charging coil and the one or more additional charging coils, at least one side of the ferrite structure is planar and is positioned adjacent to the first charging coil and the one or more additional charging coils.

18. A system comprising:
  a first charging coil comprising a first conductor arranged in a winding pattern with a first winding around a center point and each successive winding of the first charging coil is further away from the center point than the first winding and any previous windings;
  one or more additional charging coils, each charging coil comprising a conductor wound with respect to the first charging coil where each coil of an additional charging coil is arranged between each winding of the first charging coil, wherein the first charging coil and additional charging coils are connected in parallel;
  wherein the first charging coil and the second charging coil are wound in a same direction, and
  wherein each charging coil comprises an inner starting point located closer to the center point than each successive winding of the charging coil, and wherein the inner starting point for each charging coil is a same radius from the center point and the inner starting point of the first charging coil is separated from the inner starting point of the second charging coil in a direction radially around the center point;
  a ferrite structure positioned adjacent to the first charging coil and the one or more additional charging coils, the charging coils and ferrite structure comprising a charging pad; and one of
  a resonant converter connected to the charging pad and providing power to the charging pad; and
  a secondary circuit that receives power from the charging pad and conditions the power for a load.

19. The system of claim 18, wherein the charging pad comprises a primary charging pad and is connected to the resonant converter and further comprising:
  a second charging pad connected to the secondary circuit; and
  one or more of an energy storage device and a motor, the energy storage device and motor receiving power from the secondary circuit.

20. The apparatus of claim 2, wherein the first charging coil and the second charging coil each comprise an outer ending point, wherein the outer ending point of the first charging coil and the outer ending point of the second charging coil are spaced around an ending point circle centered about the center point and wherein the outer ending point of the first charging coil is equidistant from the outer ending point of the second charging coil.

* * * * *